(12) United States Patent
Kobayashi et al.

(10) Patent No.: US 6,836,622 B2
(45) Date of Patent: Dec. 28, 2004

(54) OPTICAL TRANSMITTER, AND METHOD OF CONTROLLING BIAS VOLTAGE TO THE OPTICAL TRANSMITTER

(75) Inventors: Tatsuya Kobayashi, Tokyo (JP); Kazuyuki Ishida, Tokyo (JP); Katsuhiro Shimizu, Tokyo (JP); Yukio Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 447 days.

(21) Appl. No.: 09/840,183

(22) Filed: Apr. 24, 2001

(65) Prior Publication Data

US 2002/0003648 A1 Jan. 10, 2002

(30) Foreign Application Priority Data

Jun. 30, 2000 (JP) .......................................... 2000-199897

(51) Int. Cl.⁷ .............................................. H04B 10/04
(52) U.S. Cl. ....................... 398/198; 398/182; 398/195; 359/239
(58) Field of Search ................................. 398/198, 195, 398/182; 359/239

(56) References Cited

U.S. PATENT DOCUMENTS 5,696,859 A * 12/1997 Onaka et al. ................. 385/24
6,236,488 B1 * 5/2001 Shimizu et al. ............. 398/198
6,590,686 B1 * 7/2003 Sekiya et al. ................ 398/183
2001/0007508 A1 * 7/2001 Ooi et al. .................... 359/245

FOREIGN PATENT DOCUMENTS

| EP | 0444668 A | 9/1991 |
| EP | 0547394 A | 6/1993 |
| JP | A5 142504 | 6/1993 |
| JP | A8 278224 | 10/1996 |
| JP | A2000 056279 | 2/2000 |

OTHER PUBLICATIONS

Lee, M.G. et al., "New Robust Bias Control Method for Optical Modulators" Proceedings of the SPIE, SPIE, Bellingham, VA, vol. 1291, 1990, pp. 55–65.

* cited by examiner

*Primary Examiner*—Kinfe-Michael Negash
(74) *Attorney, Agent, or Firm*—Birch, Stewart, Kolasch & Birch, LLP

(57) ABSTRACT

The optical transmitter comprises a light source which inputs continuous optical signal and a driving circuit which inputs driving signal to an optical modulator of Mach-Zehnder type. A photo coupler separates a part of the output of the optical modulator. A photo diode converts this part into electric signal. A band-pass filter and a pre-amplifier extract a frequency component of the driving signal contained in the electric signal. A mixer conducts synchronous detection between the driving signal and the extracted frequency component. Finally, a bias voltage control circuit controls a bias voltage based on a result of the phase comparison.

8 Claims, 8 Drawing Sheets

OPTICAL TRANSMITTER, AND METHOD OF CONTROLLING BIAS VOLTAGE TO THE OPTICAL TRANSMITTER

FIELD OF THE INVENTION

The present invention relates to an optical transmitter of an external modulation method employed in an optical communication system and a control method of a bias voltage to an optical modulator employed therein. More particularly, this invention relates to an optical transmitter using an optical modulator of Mach-Zehnder type and a control method of a bias voltage to an optical modulator employed therein.

BACKGROUND OF THE INVENTION

Conventionally, the optical communication system uses the direct modulation method. In this method, light intensity signal proportional to an electric signal serving as a driving current is obtained by generating an optical modulation signal with a driving current for a laser diode. However, in an ultra-fast broadband optical communication system having a transmission rate exceeding several Gbit/s, the wavelength of light changes at the direct modulation, which is known as chirping and limits a transmission capacity.

On the other hand, the chirping occurs less frequently in the external modulation method. Furthermore, in the external modulation method, modulation is relatively easy in an operating band of 10 GHz or higher, and therefore, has been applied to an ultra-fast broadband optical communication system with a large capacity. The most popular optical modulator as the external modulator is a Mach-Zehnder optical modulator using lithium niobate ($LiNbO_3$).

An output optical signal I(t) modulated by a modulation signal S(t) by using the Mach-Zehnder optical modulator is expressed by Equation (1):

$$I(t)=k\{1+\cos(\beta \cdot S(t)+\delta)\} \quad (1)$$

where k represents a proportion coefficient, $\beta$ represents a degree of modulation, and $\delta$ represents a phase at the operating point of the Mach-Zehnder optical modulator.

Given that the modulation signal S(t) is a binary digital signal, the degree of modulation $\beta$ is $\beta=\pi$, and the initial phase $\delta$ is $\delta=\pi/2$ by applying an adequate DC voltage (bias voltage) to the Mach-Zehnder optical modulator, then the Mach-Zehnder optical modulator outputs the output optical signal I(t) that switches ON/OFF in proportionate to the modulation signal S(t).

Given that the degree of modulation $\beta$ is $\beta=2\pi$, the initial phase $\delta$ is $\delta=0$ by applying an adequate bias voltage to the Mach-Zehnder optical modulator, and the modulation signal S(t) is used, then when a sine wave having a repeating frequency R is input, the output optical signal I(t) is expressed by equation (2).

$$I(t)=k\{1+\cos(2\pi \cdot \sin(2\pi R(t)))\} \quad (2)$$

Hence, the output optical signal I(t) expressed by equation (2) is output as an optical signal that switches ON/OFF at a repeating frequency 2R that is double the repeating frequency R.

There would be no problem if the phase $\delta$ is constant. However, a typical optical modulator using lithium niobate has a problem that the operating point undesirably drifts. Two types of drift are known. That is, a thermal drift induced by the pyroelectric effect caused by a temperature change; and a DC drift induced by a charge distribution over the surface of the element of the optical modulator produced by the bias voltage applied to the electrode of the optical modulator. In order to compensate variance of the operating point caused by these types of drift, it is necessary to apply a bias voltage to the optical modulator in such a manner so as to attain an optimal operating point.

FIG. 8 is a block diagram depicting an arrangement of a conventional optical transmitter capable of stabilizing a bias voltage applied to the optical modulator using lithium niobate (see Japanese Patent Application Laid-Open No. 5-142504). Continuous optical signals emitted from a light source 101 are input into a Mach-Zehnder optical modulator 103 using lithium niobate. A terminator 114 is connected to the Mach-Zehnder optical modulator 103 and a driving signal for driving the Mach-Zehnder optical modulator 103 and a bias voltage are applied to the Mach-Zehnder optical modulator 103 through a node TT.

Output optical signal modulated by the Mach-Zehnder optical modulator 103 is output to an output terminal 120 through a branching filter 104, and a part of the output optical signal is input into a photo diode 105. The photo diode 105 converts the input part of the output optical signal into an electric signal, amplifies the electric signal by means of a pre-amplifier 106, and outputs the same to a synchronous detector circuit 107.

The synchronous detector circuit 107 conducts synchronous detection between the electric signal input from the pre-amplifier 106 and a low frequency signal output from a dither signal generator 112. The synchronous detector circuit 107 includes a mixer 117, which mixes the electric signal input from the pre-amplifier 106 with the low frequency signal output from the dither signal generator 112. The resulting mixed signal is input into a low pass filter 109 through an operational amplifier 108, and the signal having passed through the low pass filter 109 is output to a bias voltage control circuit 110.

The bias voltage control circuit 110 includes a DC voltage 118 and an adder 119. The adder 119 adds an output signal from the synchronous detector circuit 107 and a bias voltage output from a DC power source 118, and outputs the sum as a bias voltage to the Mach-Zehnder optical modulator 103 from the node TT through an inductor 111. On the other hand, a driving signal is input into an input terminal 121 and output to a low frequency superimposing circuit 113 through a driving circuit 124. The low frequency superimposing circuit 113 superimposes the input driving signal and a low frequency signal output from the dither signal generator 112, and applies the resulting signal as a driving signal to the Mach-Zehnder optical modulator 103 from the node TT through a capacitor. Hence, both the driving signal superimposed with the low frequency signal and the bias voltage under the bias voltage control are applied to the Mach-Zehnder optical modulator 103 from the node TT.

How the bias voltage to the Mach-Zehnder optical modulator is controlled in the conventional optical transmitter will now be explained with reference to FIG. 9 to FIG. 11. FIG. 9 is a view explaining a modulation operation of the Mach-Zehnder optical modulator 103 when a bias voltage (phase $\delta$) is at an adequate value. Operating characteristic curve 130 of the Mach-Zehnder optical modulator 103 represents the operating characteristic curve expressed by the equation (1), and indicates a state where the bias voltage (phase $\delta$) is adequately set. In this case, upon input into the Mach-Zehnder optical modulator 103, a driving signal (input signal) 131, which has been superimposed with the low frequency signal, is modulated by the operating characteristic curve 130 and output as an output optical signal 132. The output optical signal 132 does not include a low frequency component (f[Hz]) of the low frequency signal superimposed on the driving signal, and a low frequency component (2f[Hz]) double the low frequency component (f[Hz]) is generated. Thus, after a part of the output optical signal 132 is received by the photo diode 105, amplified by the pre-amplifier 106, and let undergo the synchronous detection by the synchronous detector circuit 107, the resulting signal outputs "0". In this case, because no signal component is added by the adder 119 of the bias voltage control circuit 110, the current bias voltage is maintained and applied intact to the Mach-Zehnder optical modulator 103.

On the other hand, FIG. 10 is a view explaining a modulation operation by the Mach-Zehnder optical modulator 103 when the bias voltage is at a relatively high value compared with an adequate value. Operating characteristic curve 140 of the Mach-Zehnder optical modulator 103 indicates a state where the bias voltage is set to a relatively high value compared with an adequate value. In this case, upon input into the Mach-Zehnder optical modulator 103, a driving signal 141, which is the same as the driving signal 131 superimposed with the low frequency signal, is modulated by the operating characteristic curve 140 and output as an output optical signal 142. The output optical signal 142 includes a low frequency component (f[Hz]) of the low frequency signal superimposed on the driving signal, and the phase of the low frequency component (f[Hz]) is inverted with respect to the phase of the low frequency component (f[Hz]) superimposed on the driving signal. Hence, the synchronous detector circuit 107 conducts synchronous detection of the low frequency component (f[Hz]),and outputs a "negative" voltage to the bias voltage control circuit 110. In this case, the adder 119 of the bias voltage control circuit 110 adds the negative voltage to the bias voltage output from the DC power source 118, thereby effecting control to reduce the current bias voltage so as to be approximated to an adequate bias voltage.

Similarly, FIG. 11 is a view explaining a modulation operation by the Mach-Zehnder optical modulator 103 when the bias voltage is at a relatively low value compared with an adequate value. Operating characteristic curve 150 of the Mach-Zehnder optical modulator 103 indicates a state where the bias voltage is set at a relatively low value compared with an adequate value. In this case, upon input into the Mach-Zehnder optical modulator 103, a driving signal 151, which is the same as the driving signal 131 superimposed with the low frequency signal, is modulated by the operating characteristic curve 150 and output as an output optical signal 152. The output optical signal 152 includes a low frequency component (f[Hz]) of the low frequency signal superimposed on the driving signal, and the phase of the low frequency component (f[Hz]) coincides with the phase of a low frequency component (f[Hz]) superimposed on the driving signal. Hence, the synchronous detector circuit 107 conducts synchronous detection of the low frequency component (f[Hz]) and outputs a "positive" voltage to the bias voltage control circuit 110. In this case, the adder 119 of the bias voltage control circuit 110 adds the positive voltage to the bias voltage output from the DC power source 118, and effects control to increase the current bias voltage so as to be approximated to an adequate bias voltage.

Thus, in the control method of a bias voltage applied to the Mach-Zehnder optical modulator in the conventional optical transmitter, a part of the output optical signal output from the Mach-Zehnder optical modulator 103 is detected, and the synchronous detector circuit 107 generates an error signal corresponding to displacement of the bias voltage from the optimal operating point, whereby the bias voltage control circuit 110 controls the bias voltage to make the error signal smaller, thereby maintaining the bias voltage in a stable manner.

Incidentally, in the conventional method, the low frequency signal is superimposed on the driving signal. However, the low frequency superimposing circuit 113 for superimposing the low frequency signal on the driving signal uses devices, such as a voltage control attenuator and a voltage control variable gain amplifier, which are not shown in the diagrams. Therefore, when the band of a driving signal reaches 10 GHz or higher, the operating band for these devices become insufficient, and this causes waveform deformation of the driving signal to be applied to the Mach-Zehnder optical modulator 103, resulting in a problem that the quality of the output optical signal is deteriorated.

Furthermore, in the Mach-Zehnder optical modulator 103 of the conventional optical transmitter, the low frequency signal, that is a dither signal, has to be superimposed on the driving signal to monitor the drift of the optimal operating point at the modulation. This demands the dither signal generator 112 and low frequency superimposing circuit 113, thereby posing a problem that the device cannot be made more compact and lighter.

The conventional optical transmitter obtains an output optical signal in proportionate to the repeating frequency R of the driving signal. However, there has been also an increasing need to stably control the bias voltage to the Mach-Zehnder optical modulator employed in the optical transmitter which outputs an output optical signal having the repeating frequency 2R that is double the repeating frequency R of the driving signal.

SUMMARY OF THE INVENTION

It is an object of this invention to provide an optical transmitter capable of preventing deterioration of the quality of an output optical signal by readily effecting stabilization control of a bias voltage and readily effecting stabilization control of a bias voltage when outputting an output optical signal having a repeating frequency 2R that is double the repeating frequency R of the driving signal when the band of a driving signal reaches 10 GHz or higher. It is another object of this invention to provide a method of controlling a bias voltage to an optical modulator employed in an optical transmitter.

In the optical transmitter according to one aspect of this invention, a driving unit inputs the driving signal into the Mach-Zehnder optical modulator to modulate the optical signal input from the light source to be output. A converting unit takes out a part of the optical signal output from the optical modulator to be converted into an electric signal. An extracting unit extracts a frequency component of the driving signal contained in the converted electric signal obtained by the converting unit. A phase comparing unit compares phases of the driving signal input into the driving unit and the frequency component of the driving signal extracted by the extracting unit. A bias voltage control unit effects feedback control on a bias voltage to be applied to the optical modulator based on a result of the phase comparison.

In the control method of a bias voltage to an optical modulator employed in an optical transmitter according to another aspect of this invention, a part of an optical signal output from a Mach-Zehnder optical modulator is taken out to be converted into an electric signal. Then, a frequency component of the driving signal contained in the converted electric signal is extracted. Furthermore, phases of the input signal and the extracted frequency component of the driving signal are compared. Finally, a bias voltage to be applied to the optical modulator is fed back under control based on a result of phase comparison.

Other objects and features of this invention will become apparent from the following description with reference to the accompanying drawings.

DESCRIPTION OF THE PREFERRED EMBODIMENTS

Preferred embodiments of the optical transmitter and the control method of a bias voltage to an optical modulator employed therein, according to the present invention will be explained in detail below with reference to the accompanying drawings.

Figure 1:
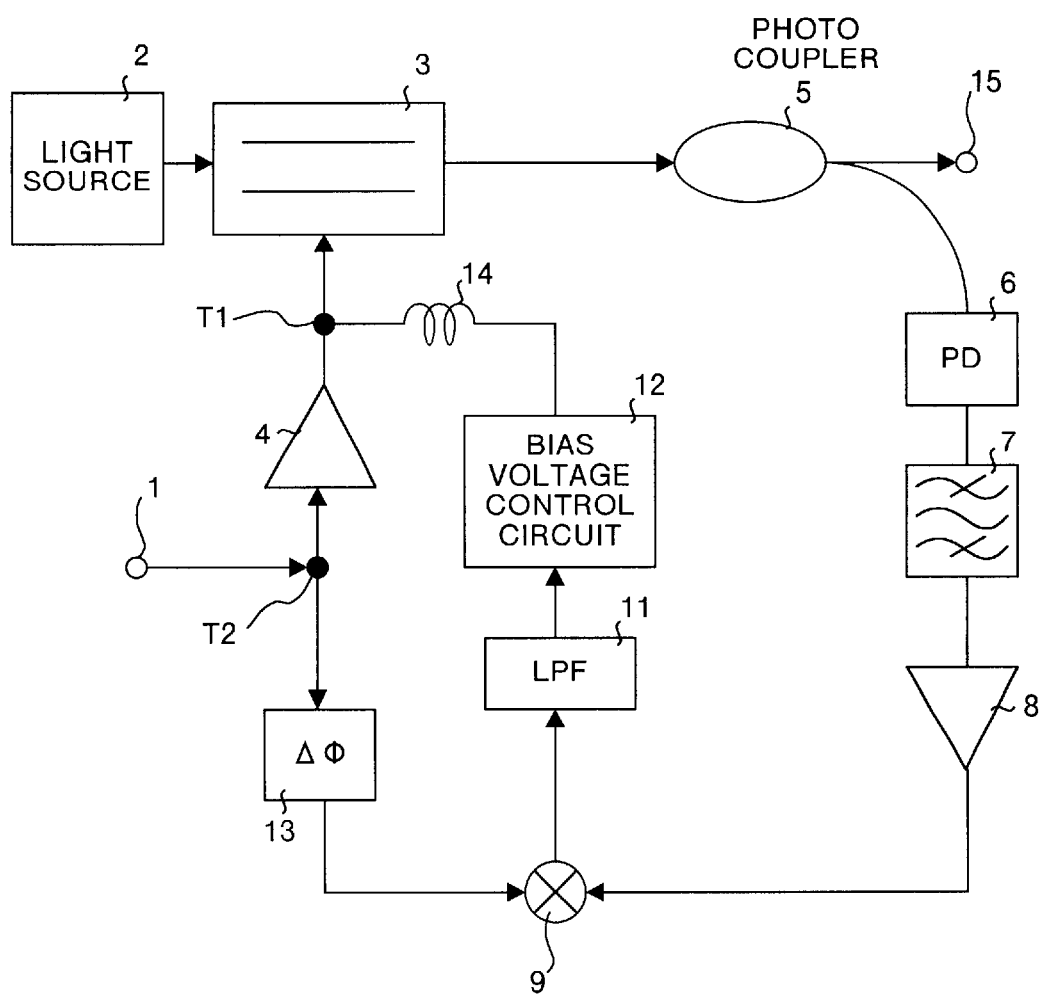
FIG. 1 is a block diagram depicting an arrangement of an optical transmitter in accordance with a first embodiment of the present invention.

FIG. 1 is a block diagram depicting an arrangement of an optical transmitter in accordance with a first embodiment of the present invention. Continuous optical signals emitted from a light source 2 are input into a Mach-Zehnder optical modulator 3 using lithium niobate. A driving signal for driving the Mach-Zehnder optical modulator 3 and a bias voltage are applied to the Mach-Zehnder optical modulator 3 through a node T1. The Mach-Zehnder optical modulator 3 has an operating characteristic curve set in response to a bias voltage, and modulates the continuous optical signals from the light source 2 by the input driving signal in accordance with the operating characteristic curve so as to be output as an output optical signal.

The output optical signal modulated by the Mach-Zehnder optical modulator 3 is output to an end terminal 15 through a photo coupler 5, and apart of the output optical signal is input into a photo diode 6. The photo diode 6 converts the input part of the output optical signal into an electric signal, and outputs the same to a band pass filter 7. The bandpass filter 7 allows only the repeating frequency component (R[Hz]) of the driving signal contained in the input electric signal to pass through to be output to a pre-amplifier 8. The pre-amplifier 8 amplifies the passed frequency component (R[Hz]) and outputs the same to a mixer 9.

On the other hand, the driving signal, which is input from an input terminal 1 for driving the Mach-Zehnder optical modulator 3, is output to a driving circuit 4 and a phase shifter 13 through a node T2. The driving signal input into the driving circuit 4 is applied to the Mach-Zehnder optical modulator 3 through the node T1. The driving signal input into the phase shifter 13 is phase-adjusted and output to the mixer 9.

The mixer 9 mixes the signal input from the pre-amplifier 8 and the driving signal input from the phase shifter 13 and conducts synchronous detection. The resulting mixed signal is input into a low pass filter 11, so that only a low frequency component is allowed to pass through to be output to a bias voltage control circuit 12. The bias voltage control circuit 12 outputs a bias voltage such that a bias voltage to the Mach-Zehnder optical modulator 3 attains an optimal operating point based on the value of the low frequency component output from the low pass filter 11, and applies the same to the Mach-Zehnder optical modulator 3 through an inductor 14 and the node T1.

Figure 2:
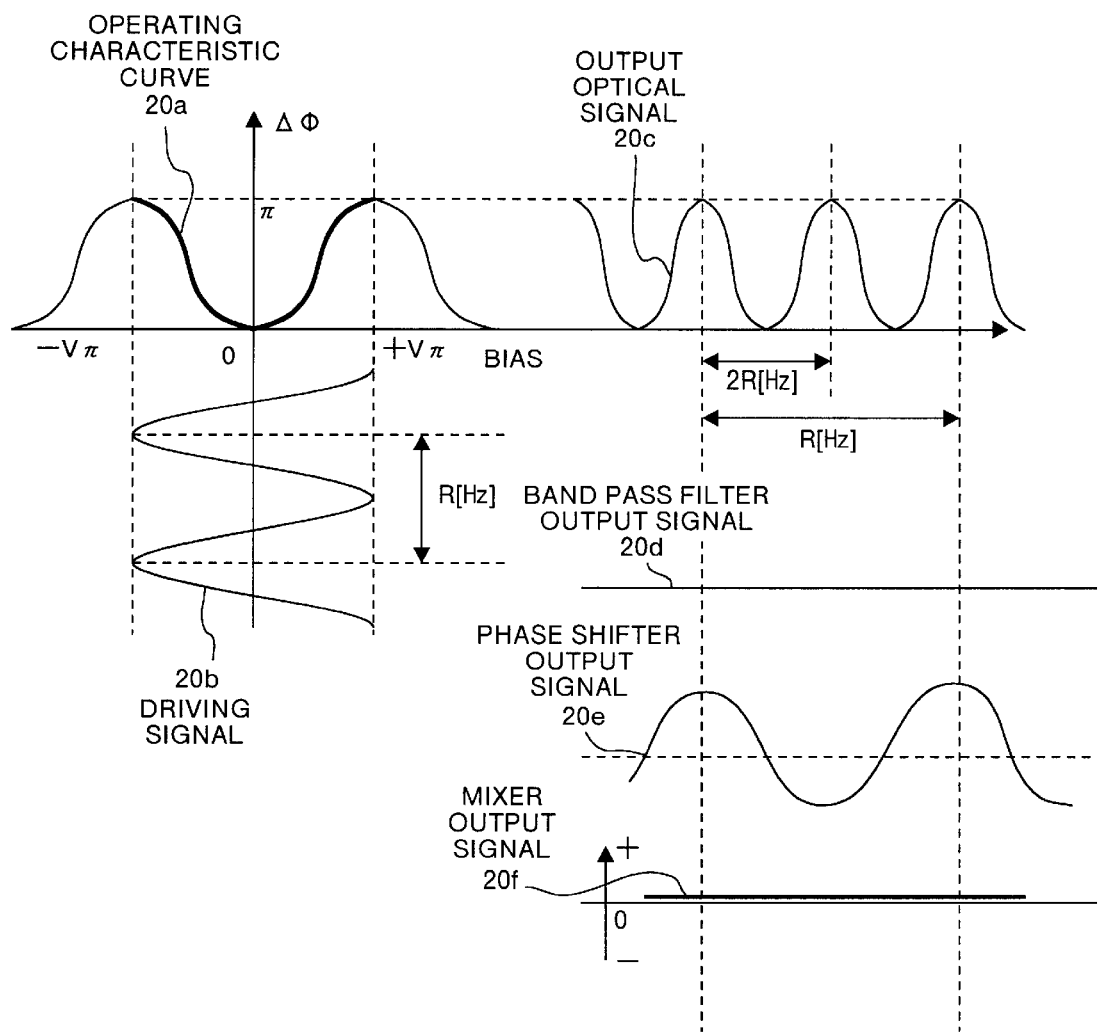
FIG. 2 is a view explaining a modulation operation by a Mach-Zehnder optical modulator when a bias voltage of the Mach-Zehnder optical modulator shown in FIG. 1 is at an adequate value.

How the bias voltage to the Mach-Zehnder optical modulator 3 is controlled by this optical transmitter will be explained with reference to FIG. 2 to FIG. 4. FIG. 2 is a view explaining a modulation operation by the Mach-Zehnder optical modulator 3 when a bias voltage (phase $\delta$) is at an adequate value. Operating characteristic curve 20a of the Mach-Zehnder optical modulator 3 represents the operating characteristic curve expressed by the equation (1), and indicates a state where the bias voltage (phase $\delta$) is set adequately. In this case, it is corresponded to the equation (2), the degree of modulation $\beta$ is set as $\beta=2\pi$ and the initial phase $\delta$ is set as $\delta=0$, and the Mach-Zehnder optical modulator 3 outputs an output optical signal 20c having a repeating frequency 2R (2R[Hz]) that is double the repeating frequency R (R[Hz]) by a driving signal 20b having the repeating frequency R (R[Hz]).

A part of the output optical signal 20c is branched by the photo coupler 5, which is detected by the photo diode 6 and converted into an electric signal to be output to the band pass filter 7. The band pass filter 7 allows only the repeating frequency R component corresponding to the driving signal 20b contained in the output optical signal 20c to pass through, and outputs the same to the pre-amplifier 8 as a band pass filter output signal 20d. In this case, because the electric signal input from the photo diode 6 does not include the repeating frequency R component, a value "0" is given to the band pass filter output signal 20d. Accordingly, a signal output output from the pre-amplifier 8 to the mixer 9 also has a value "0".

On the other hand, a phase shifter output signal 20e obtained by phase-adjusting the driving signal 20b is input into the mixer 9 through the phase shifter 13. The mixer 9 conducts synchronous detection between the phase shifter output signal 20e and a signal obtained by amplifying the band pass filter output signal 20d by means of mixing, and outputs the resulting signal to the low pass filter 11 as a mixer output signal 20f. In this case, because a value "0" is given to the signal obtained by amplifying the band pass filter output signal 20d, the mixer output signal 20f also has a value "0". Accordingly, a signal output from the low pass filter 11 to the bias voltage control circuit 12 has a value "0" too, and the bias voltage control circuit 12 applies the bias voltage maintained at the current bias voltage to the Mach-Zehnder optical modulator 3 through the inductor 14 and node T1.

Figure 3:
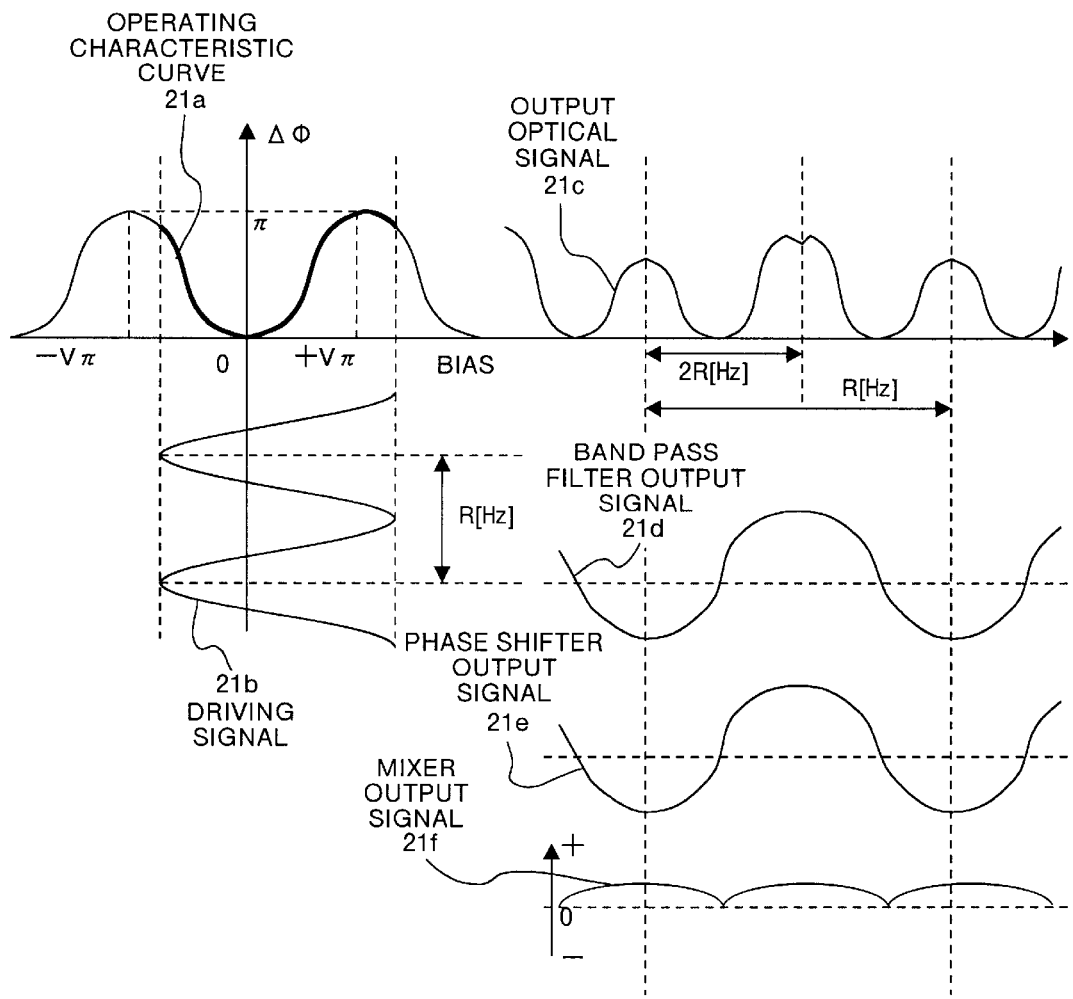
FIG. 3 is a view explaining a modulation operation by a Mach-Zehnder optical modulator when a bias voltage of the Mach-Zehnder optical modulator shown in FIG. 1 is at a relatively high value compared with an adequate value.

On the contrary, FIG. 3 is a view explaining a modulation operation by the Mach-Zehnder optical modulator 3 when a bias voltage applied to the Mach-Zehnder optical modulator 3 is at a relatively high value compared with an adequate value. An operating characteristic curve 21a of the Mach-Zehnder optical modulator 3 shown in FIG. 3 is in a state where a bias voltage is set to a relatively high value compared with the operating characteristic curve 20a shown in FIG. 2.

A part of an output optical signal 21c is branched by the photo coupler 5, which is detected by the photo diode 6 and converted into an electric signal to be output to the band pass filter 7. The band pass filter 7 allows only the repeating frequency R component corresponding to a driving signal 21b that is the same as the driving signal 20b and contained in the output optical signal 21c to pass through, and outputs the same to the pre-amplifier 8 as a band pass filter output signal 21d. In this case, because the electric signal input from the photo diode 6 includes the repeating frequency R component, a waveform of the band pass filter output signal 21d as shown in FIG. 3 is output. Further, the pre-amplifier 8 amplifies the band pass filter output signal 21d of the repeating frequency R component, and outputs the same to the mixer 9.

On the other hand, as was shown in FIG. 2, phase shifter output signal 21e obtained by phase-shifting the driving signal 21b that is the same as the driving signal 20b is input into the mixer 9 through the phase shifter 13. The mixer 9 conducts synchronous detection between the phase shifter output signal 21e and a signal obtained by amplifying the band pass filter output signal 21d by means of mixing, and outputs the resulting signal to the low pass filter 11 as a mixer output signal 21f. In this case, the mixer output signal 21f is output as a signal shown in FIG. 3. Here, because the phase shifter output signal 21e and the signal obtained by amplifying the band pass filter output signal 21d have the same phase, a value of the mixer output signal 21f is output as a "positive" value. The mixer output signal 21f is input into the bias voltage control circuit 12 through the low pass filter 11. Then, the bias voltage control circuit 12 adds a value in proportionate to the value of the input mixer output signal 21f to the current bias voltage, and applies the resulting added bias voltage to the Mach-Zehnder optical modulator 3 through the inductor 14 and node T1, whereby the operating point of the Mach-Zehnder optical modulator 3 is approximated to an optimal operating point.

Figure 4:
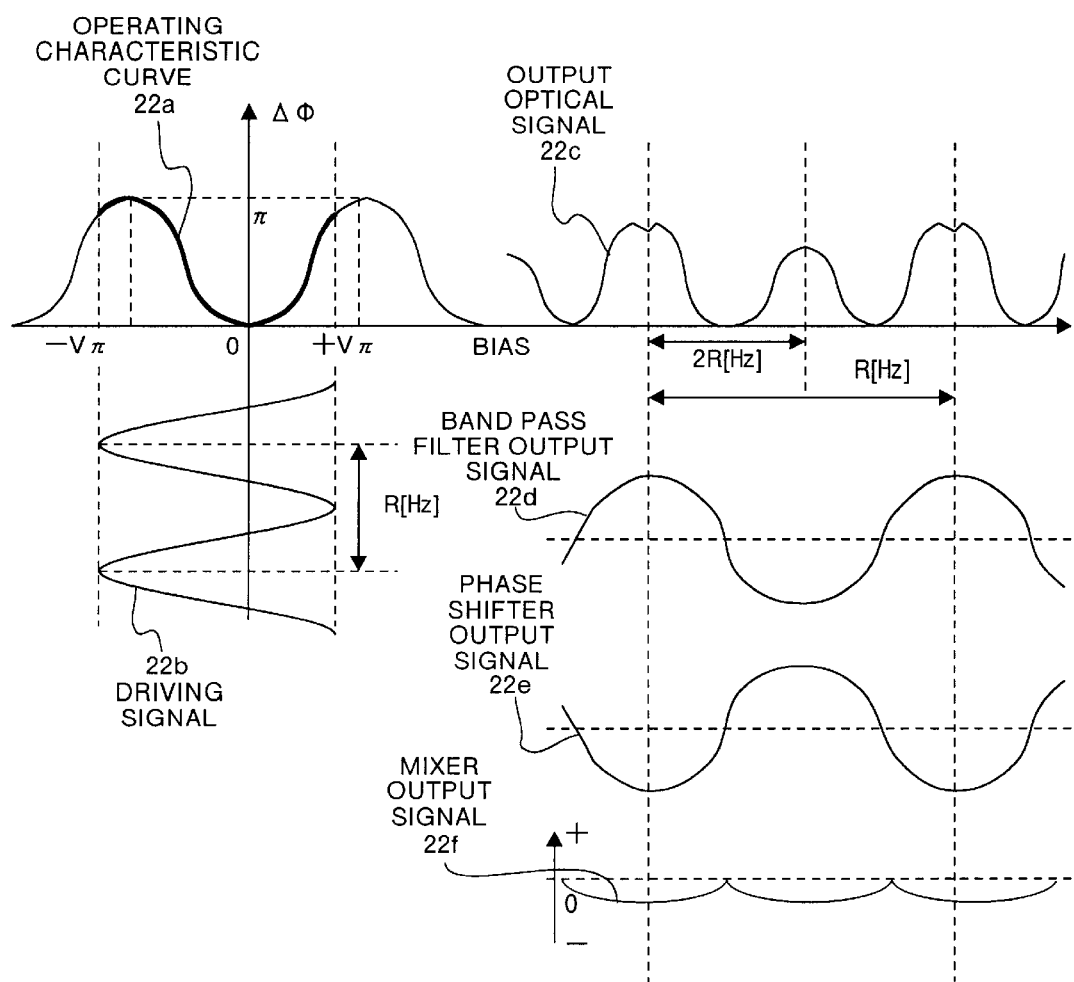
FIG. 4 is a view explaining a modulation operation by a Mach-Zehnder optical modulator when a bias voltage of the Mach-Zehnder optical modulator shown in FIG. 1 is at a relatively low value compared with an adequate value.

On the contrarily, FIG. 4 is a view explaining a modulation operation by the Mach-Zehnder optical modulator 3 when a bias voltage applied to the Mach-Zehnder optical modulator 3 is at a relatively low value compared with an adequate value. An operating characteristic curve 22a of the Mach-Zehnder optical modulator 3 shown in FIG. 4 indicates a state where a bias voltage is set to a relatively high value compared with the operating characteristic curve 20a shown in FIG. 2.

A part of an output optical signal 22c is branched by the photo coupler 5, which is detected by the photo diode 6 and converted into an electric signal to be output to the band pass filter 7. The band pass filter 7 allows only the repeating frequency R component corresponding to a driving signal 22b that is the same as the driving signal 20b and contained in the output optical signal 22c to pass through, and outputs the same to the pre-amplifier 8 as a band pass filter output signal 22d. In this case, because the electric signal input from the photo diode 6 includes the repeating frequency R component, a waveform of the band pass filter output signal 22d as shown in FIG. 4 is output. Further, the pre-amplifier 8 amplifies the band pass filter output signal 22d of the repeating frequency R component, and outputs the same to the mixer 9.

On the other hand, as shown in FIG. 2, a phase shifter output signal 22e obtained by phase-shifting the driving signal 22b that is the same as the driving signal 20b is input into the mixer 9 through the phase shifter 13. The mixer 9 conducts synchronous detection between the phase shifter output signal 22e and a signal obtained by amplifying the band pass filter output signal 22d by means of mixing, and outputs the resulting signal to the low pass filter 11 as a mixer output signal 22f. In this case, the mixer output signal 22f is output as a signal shown in FIG. 4. Because the phase shifter output signal 22e and the signal obtained by amplifying the band pass filter output signal 22d have the invert phases, a value of the mixer output signal 22f is output as a "negative" value. The mixer output signal 22f is input into the bias voltage control circuit 12 through the low pass filter 11. The bias voltage control circuit 12 adds a value in proportionate to the value of the input mixer output signal 22f to the current bias voltage, that is, subtracts the former from the latter, and applies the resulting subtracted bias voltage to the Mach-Zehnder optical modulator 3 through the inductor 14 and node T1, whereby the operating point of the Mach-Zehnder optical modulator 3 is approximated to an optimal operating point.

As has been discussed, the optical transmitter is arranged in such a manner that the bias voltage control circuit 12 effects the feedback control to correct the operating point of the Mach-Zehnder optical modulator 3 to an optimal operating point based on the error signal of the bias voltage indicated by the mixer output signals 20f to 22f. Here, the mixer output signals 20f to 22f indicate not only the magnitude of displacement of the bias voltage, but also the direction of the displacement of the bias voltage, and therefore, the bias voltage control is effected in a reliable manner with the mixer output signals 20f to 22f.

The pre-amplifier of the above described optical transmitter is preferably realized by a limiter amplifier. Furthermore, the bias voltage control circuit 12 can be realized by a DC power source as a bias voltage power source and an operation amplifier for amplifying an output from the DC power source in accordance with the mixer output signals 20f to 22f. It has been mentioned above that the repeating frequency R component is extracted from the output optical signals 20c to 22c by the band pass filter 7 and pre-amplifier 8. However, the repeating frequency R component in the output optical signals 20c to 22c may be extracted by a PLL instead.

Furthermore, the driving signal and bias voltage are synthesized at the node T1, and the synthesized signal is applied to the Mach-Zehnder optical modulator 3. However, the arrangement is not limited to the foregoing. That is, this invention is applicable to a Mach-Zehnder optical modulator that receives the driving signal and bias voltage at their respective input terminals.

Further, an optical filter may be additionally provided in the preceding stage of the photo diode 6. When an optical signal output from the light source 2 contains unwanted waveform component and noise component, the optical filter allows only the wavelength of the output optical signal component to pass through selectively, thereby achieving the bias voltage control with high overall accuracy.

According to the first embodiment, displacement of the bias voltage is detected directly from the driving signal and output optical signal without superimposing a low frequency signal, such as a dither signal, on the driving signal, and the bias voltage is controlled based on the mixer output signal thus detected. Therefore, even when the band of a driving signal reaches 10 GHz or higher, the bias voltage can be readily controlled, thereby making it possible to prevent deterioration of the quality of the output optical signal caused by the waveform deformation of the driving signal.

A second embodiment of the present invention will now be explained. In the first embodiment, the light source 2 emits continuous optical signals, which are modulated by the driving signal. However, in the second embodiment, the light source 2 outputs an optical pulse in synchronization with the driving signal. Accordingly, a pulse-modulated optical signal is output from the Mach-Zehnder optical modulator 3 by using the driving signal.

Figure 5:
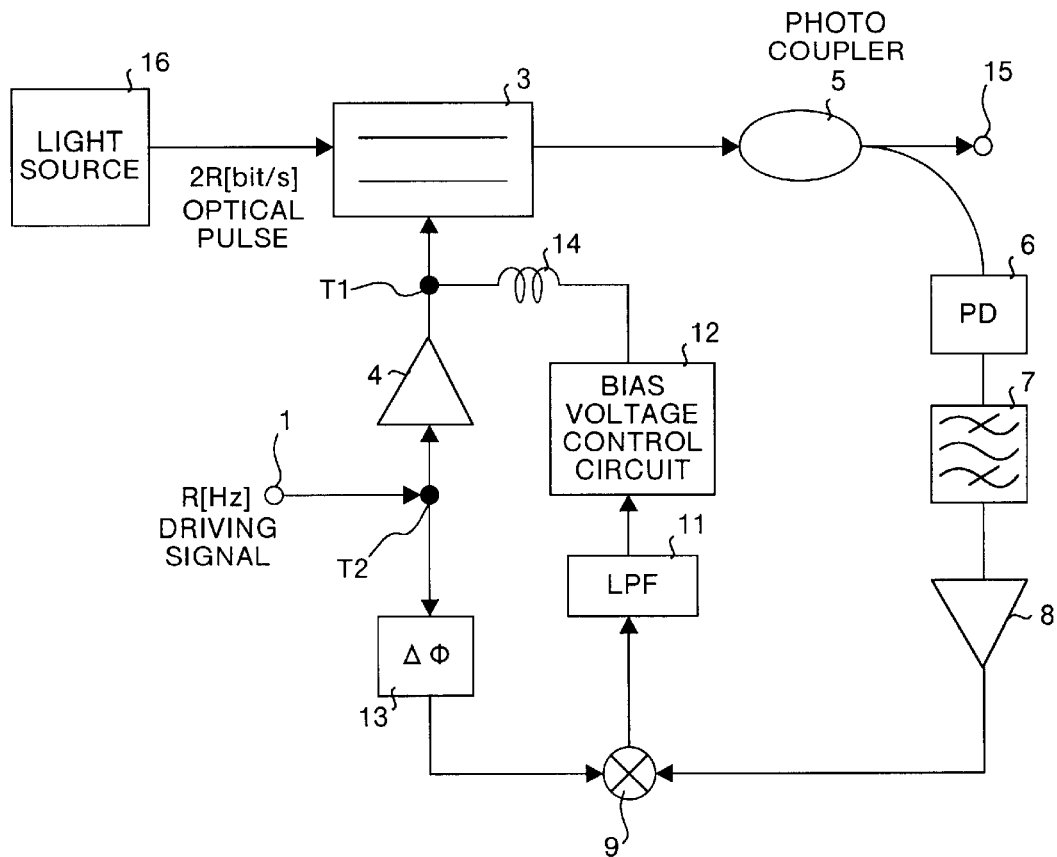
FIG. 5 is a block diagram depicting an arrangement of an optical transmitter in accordance with a second embodiment of the present invention.

FIG. 5 is a block diagram depicting an arrangement of an optical transmitter in accordance with the second embodiment of the present invention. Light source 16 is a pulse light source that outputs an optical pulse in synchronization with the driving signal. For example, the light source 16 outputs an optical pulse having a bit rate double the repeating frequency R of the driving signal. The rest of the configuration is the same as that in the first embodiment, and like components are labeled with like reference numerals or symbols.

The light source 16 can be realized by, for example, a device that outputs an optical pulse by gain switching a semiconductor laser, a ring oscillator using a fiber-type optical amplifier, a device for modulating continuous optical signals into a pulsed light by a Mach-Zehnder modulator to be output, etc. In this case, because an optical pulse output from the light source 16 is modulated by the Mach-Zehnder optical modulator 3, an output optical signal output from the output terminal 15 is a pulse-modulated RZ signal. Thus, a signal detected by the photo diode 6 through the photo coupler 5 is also becomes the RZ signal. The band pass filter 7 allows only the repeating frequency R component to pass through, and the passed signal is amplified by the pre-amplifier 8, after which a mixer output signal is generated by the mixer 9. Hence, the bias voltage can be controlled in the same manner as was in the first embodiment.

Figure 6:
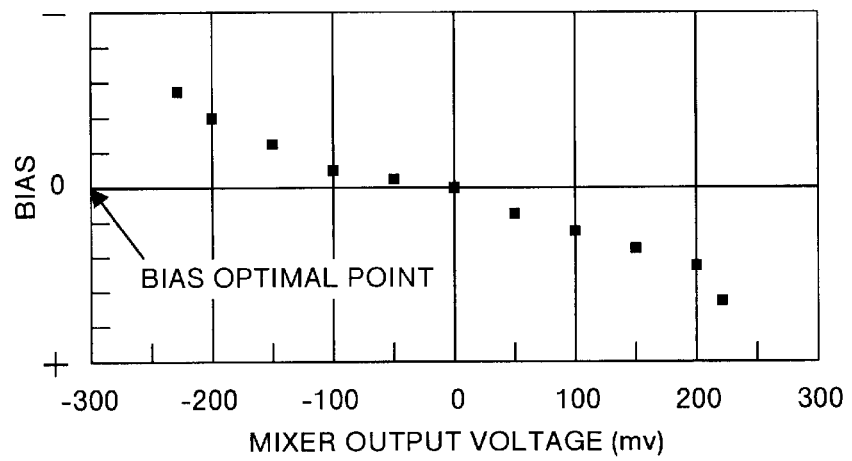
FIG. 6 is a view showing an experimental result when a relation between a mixer output voltage from the optical transmitter shown in FIG. 5 and a bias voltage is measured.

FIG. 6 shows an experimental result when a relation between the mixer output signal (mixer output voltage) in the optical transmitter shown in FIG. 5 and the bias voltage controlled by the mixer output signal is measured. As shown in FIG. 6, even if an optical pulse is input from the light source 16, the bias voltage can be controlled to stay at an optimal operating point in accordance with the mixer output voltage. The result shown in FIG. 6 is a result when the mixer output signal output from the mixer 9 is measured in an open state without feeding back the mixer output signal (error signal) output from the mixer 9 to the bias voltage control circuit 12.

According to the second embodiment, even when the optical signal input into the Mach-Zehnder optical modulator 3 is an optical pulse, the bias voltage to the Mach-Zehnder optical modulator 3 can be controlled to stay at an optimal operating point as long as the output optical signal from the Mach-Zehnder optical modulator 3 contains the repeating frequency R component of the driving signal. Also, like in the first embodiment, even when the band of a driving signal reaches 10 GHz or higher, the bias voltage can be readily controlled, thereby making it possible to prevent deterioration of the quality of the output optical signal caused by the waveform deformation of the driving signal.

A third embodiment of the present invention will now be explained below. In the first and second embodiments, the modulation is carried out by applying the driving signal to one electrode of the Mach-Zehnder optical modulator 3. However, in this third embodiment, the Mach-Zehnder optical modulator 3 is a push-pull Mach-Zehnder optical modulator that carries out a modulation operation when two driving signals having opposite polarities are applied to two electrodes, respectively.

Figure 7:
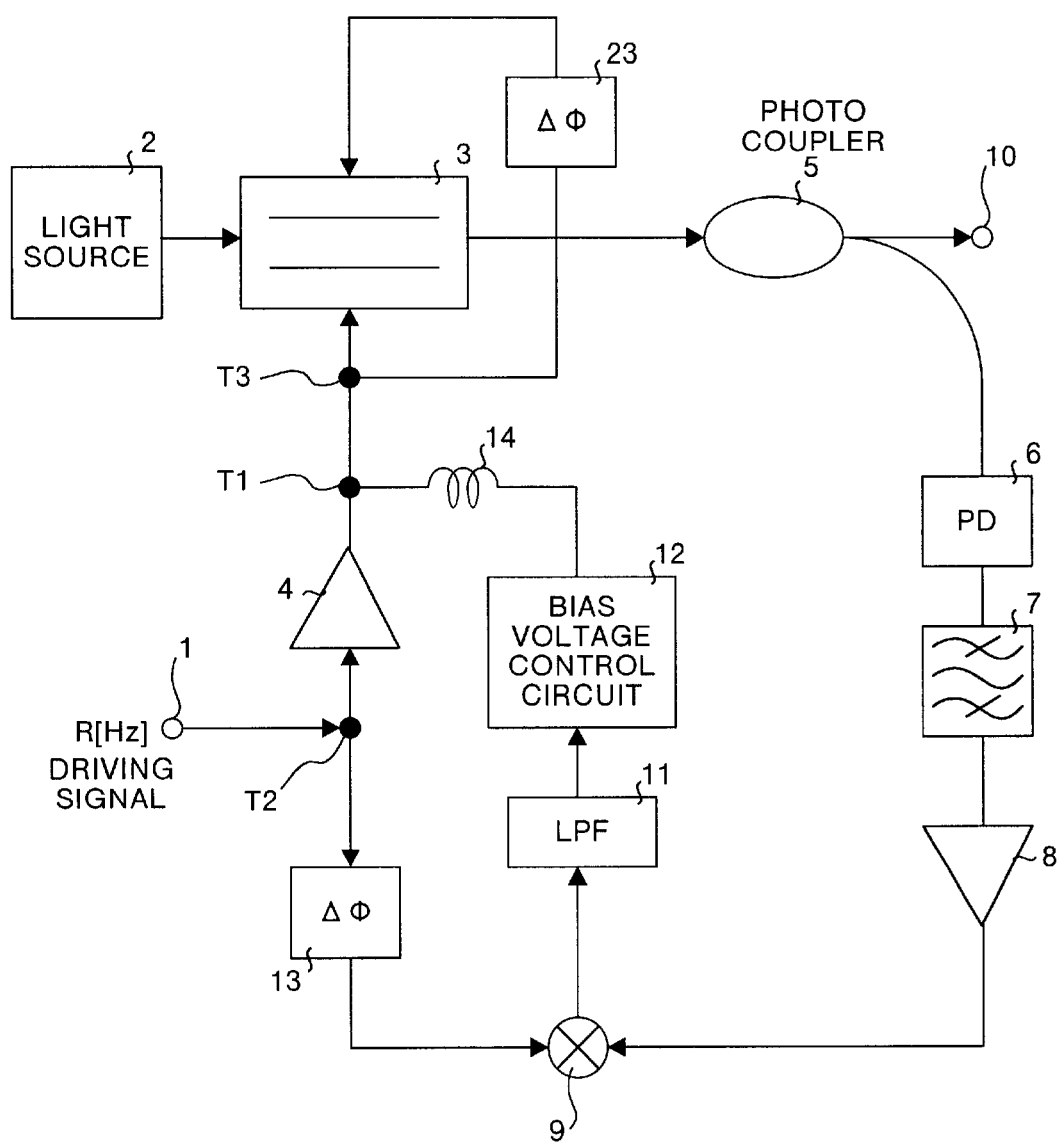
FIG. 7 is a block diagram depicting an arrangement of a n optical transmitter in accordance with a third embodiment of the present invention.
Figure 8:
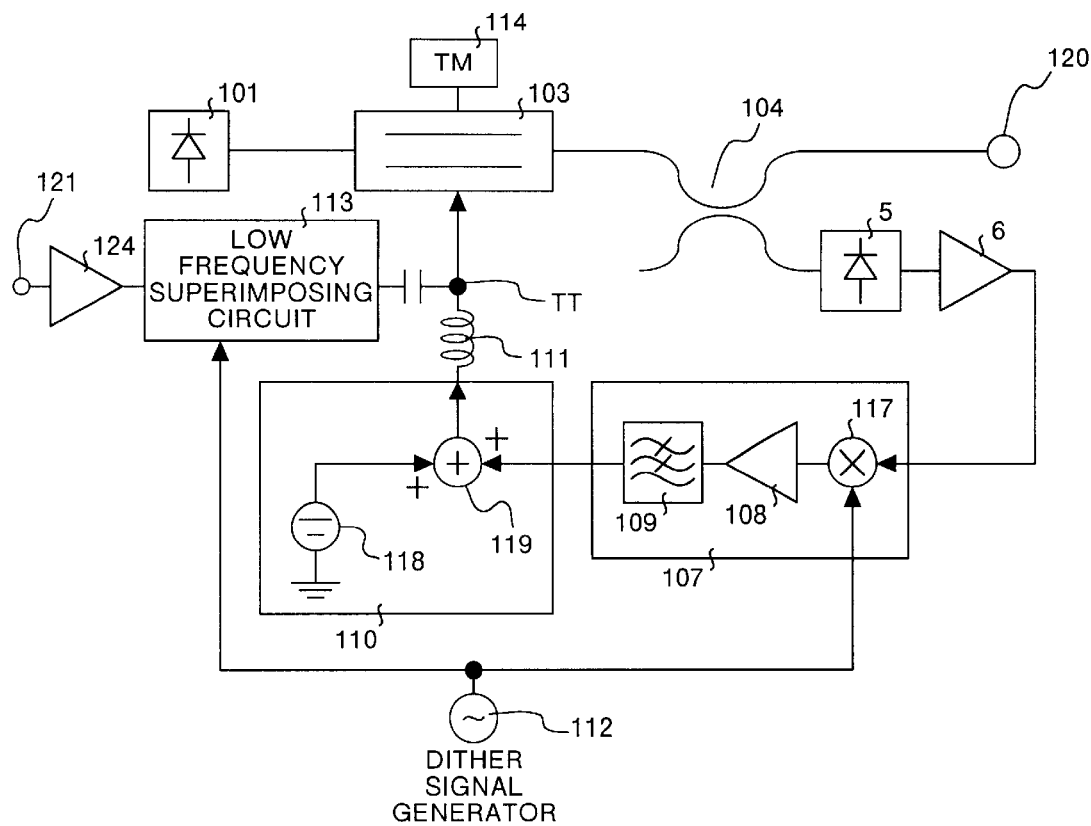
FIG. 8 is a block diagram depicting an arrangement of a conventional optical transmitter.
Figure 9:
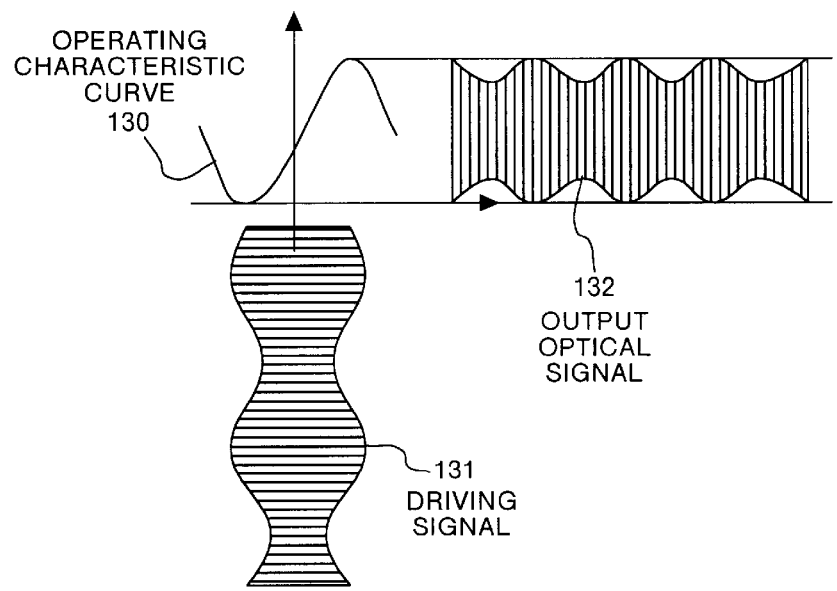
FIG. 9 is a view explaining a modulation operation by a Mach-Zehnder optical modulator when a bias voltage of the Mach-Zehnder optical modulator shown in FIG. 8 is at an adequate value.
Figure 10:
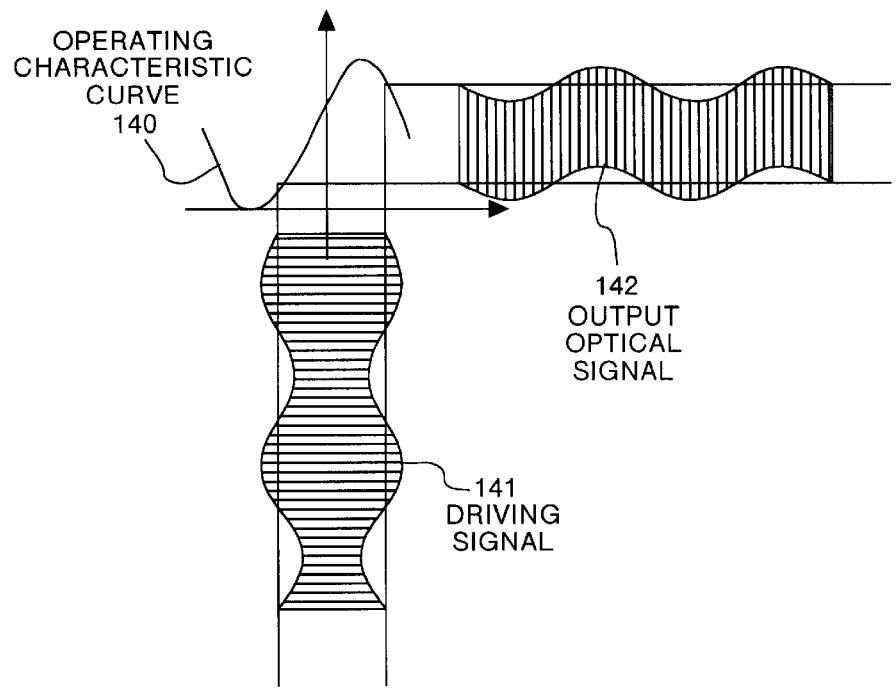
FIG. 10 is a view explaining a modulation operation by a Mach-Zehnder optical modulator when a bias voltage of the Mach-Zehnder optical modulator shown in FIG. 8 is at a relatively high value compared with an adequate value.
Figure 11:
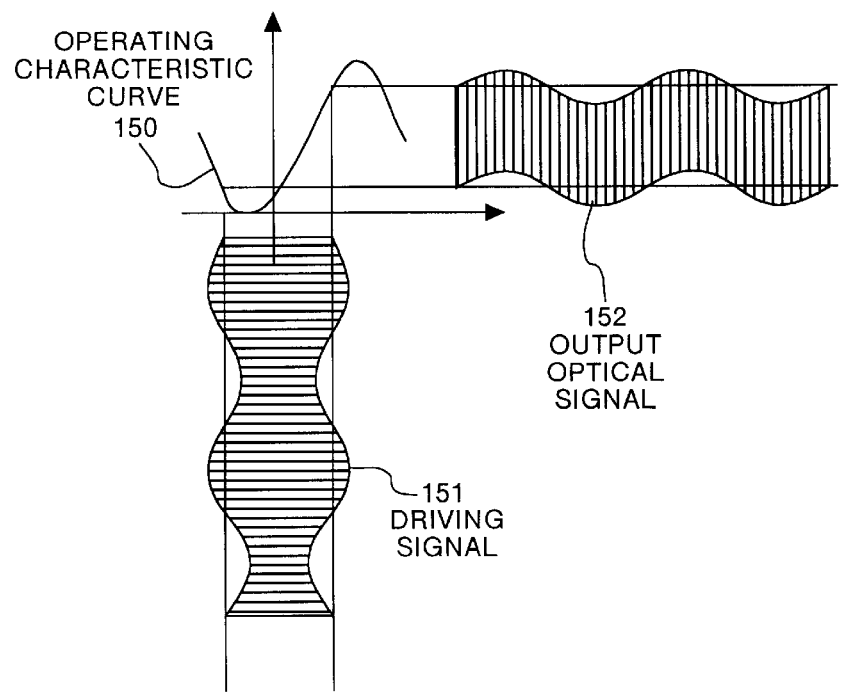
FIG. 11 is a view explaining a modulation operation by a Mach-Zehnder optical modulator when a bias voltage of the Mach-Zehnder optical modulator shown in FIG. 8 is at a relatively low value compared with an adequate value.

FIG. 7 is a block diagram depicting an arrangement of an optical transmitter in accordance with the third embodiment of the present invention. As shown in this figure, a phase shifter 23 is additionally provided. The driving signal and a bias voltage are applied to one electrode of the Mach-Zehnder optical modulator 3 from the node T1, and the driving signal whose phase has been inverted by the phase shifter 23 and the bias voltage are applied to the other electrode from a node T3. The rest of the configuration is the same as that in the first embodiment, and like components are labeled with like reference numerals or symbols.

Thus, the driving signals having opposite polarities are applied respectively to the electrodes of the Mach-Zehnder optical modulator 3. Accordingly, the push-pull operation is carried out. Because of the push-pull operation, an optical signal input from the light source 2 is modulated and the chirping in the output optical signal is reduced.

According to the third embodiment, because the push-pull operation is effected by applying the driving signals having opposite polarities respectively to the electrodes of the Mach-Zehnder optical modulator 3, the chirping in the output optical signal can be reduced. As a consequence, deterioration of quality of the output optical signal can be further prevented.

As explained above, according to one aspect of the invention, the driving unit inputs the driving signal to the Mach-Zehnder optical modulator to modulate the optical signal input from the light source to be output. The converting unit takes out a part of the optical signal output from the optical modulator to be converted into an electric signal. The extracting unit extracts a frequency component of the driving signal contained in the converted electric signal obtained by the converting unit. The phase comparing unit compares phases of the driving signal input into the driving unit and the frequency component of the driving signal extracted by the extracting unit. The bias voltage control unit effects feedback control on a bias voltage to be applied to the optical modulator based on a result of the phase comparison. Hence, the bias voltage can be controlled without providing a device arrangement for superimposing a low frequency signal, such as a dither signal, on the driving signal. Moreover, the bias voltage can be readily controlled when the band of a driving signal reaches 10 GHz or higher. This offers an effect that it is possible to prevent deterioration of the quality of an output optical signal caused by waveform deformation of the driving signal.

Furthermore, the mixer of the phase comparing unit mixes the signal input into the driving unit and the frequency component of the driving signal extracted by the extracting unit for synchronous detection, and the low pass filter allows only a low frequency component contained in an output from the mixer to pass through, so that the bias voltage control unit controls the bias voltage based on an output from the low pass filter. Hence, the bias voltage can be controlled by using the result of the phase comparison using only the desired low frequency component the bias voltage controlling means uses, thereby offering an effect that the bias voltage can be readily controlled.

Furthermore, the light source generates an optical pulse modulated at double a bit rate of the driving signal in sync with the driving signal to be input into the optical modulator, and the optical modulator pulse-modulates the optical pulse with the driving signal to be output. Hence, even when the optical signal input into the optical modulator is an optical pulse, the bias voltage can be controlled without providing a device arrangement for superimposing a low frequency signal, such as a dither signal, on the driving signal. Moreover, the bias voltage can be readily controlled when the band of a driving signal reaches 10 GHz or higher. This offers an effect that it is possible to prevent deterioration of the quality of an output optical signal caused by waveform deformation of the driving signal.

Furthermore, the driving signal is applied to one electrode of the optical modulator and a driving signal whose polarity is inverted by the phase shifter is applied to the other electrode, so that the optical signal output from the light source is modulated to a push-pull signal by the two driving signals to be output. Hence, the chirping in the output optical signal can be reduced, and as a consequence, there can be offered an effect that it is possible to further prevent deterioration of the quality of an output optical signal.

According to another aspect of the invention, a part of an optical signal output from the Mach-Zehnder optical modulator is taken out to be converted into an electric signal in the converting step; a frequency component of the driving signal contained in the converted electric signal obtained in the converting step is extracted in the extracting step; in the phase comparing step, phases are compared between the signal input in the driving step and the frequency component of the driving signal extracted in the extracting step; and in the bias voltage controlling step, the bias voltage to be applied to the optical modulator is fed back under control based on a result of phase comparison in the phase comparing step. Hence, the bias voltage can be controlled without superimposing a low frequency signal, such as a dither signal, on the driving signal. Moreover, the bias voltage can be readily controlled when the band of a driving signal reaches 10 GHz or higher. This offers an effect that it is possible to prevent deterioration of the quality of an output optical signal caused by waveform deformation of the driving signal.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transmitter which outputs an optical pulse-train having double a frequency of a driving signal for transmission, said optical transmitter comprising:

an optical modulator of Mach-Zehnder type;

a light source which outputs light that is input into said optical modulator;

a driving unit which inputs the driving signal into said optical modulator;

a converting unit which converts a part of the optical signal output from said optical modulator into an electric signal;

an extracting unit which extracts a frequency component of the driving signal contained in the converted electric signal obtained by said converting unit;

a phase comparing unit which compares phases of the driving signal input into said driving unit and the frequency component of the driving signal extracted by said extracting unit; and a bias voltage control unit which controls a bias voltage to be applied to said optical modulator based on a result of the phase comparison.

2. The optical transmitter according to claim 1, wherein said phase comparing unit includes, a mixer which mixes the signal input into said driving unit and the frequency component of the driving signal extracted by said extracting unit; and a low pass filter which allows only a low frequency component contained in an output from said mixer to pass through, wherein said bias voltage control unit controls the bias voltage based on an output from said low pass filter.

3. The optical transmitter according to claim 1, wherein said light source generates an optical pulse modulated at double a bit rate of the driving signal in synchronization with the driving signal to be input into said optical modulator; and said optical modulator pulse-modulates the optical pulse with the driving signal to be output.

4. The optical transmitter according to claim 1, wherein the bias voltage that is applied to the driving signal is directly inputted to said optical modulator after being applied to the driving signal.

5. The optical transmitter according to claim 1, wherein the extracting unit includes a band pass filter for extracting a frequency component of the driving signal, the frequency component being a repeating frequency component.

6. An optical transmitter which outputs an optical pulse-train having double a frequency of a driving signal for transmission, said optical transmitter comprising:

an optical modulator of Mach-Zehnder type;

a light source which outputs light that is input into said optical modulator;

a driving unit which inputs the driving signal into said optical modulator;

a converting unit which converts a past of the optical signal output from said optical modulator into an electric signal;

an extracting unit which extracts a frequency component of the driving signal contained in the converted electric signal obtained by said converting unit;

a phase comparing unit which compares phases of the driving signal input into said driving unit and the frequency component of the driving signal extracted by said extracting unit;

a bias voltage control unit which controls a bias voltage that is applied to said optical modulator based on a result of the phase comparison; and a phase shifter which inverts a polarity of the driving signal, wherein the driving signal is applied to one electrode of said optical modulator and a driving signal whose polarity is inverted by said phase shifter is applied to the ether electrode, so that the light output from said light source is modulated to a push-pull signal by said two driving signals to be output.

7. A control method of a bias voltage to an optical modulator employed in an optical transmitter, wherein light is input into an optical modulator of Mach-Zehnder type while a driving signal and a bias voltage are applied to said optical modulator, and an optical pulse-train having double a frequency of said driving unit is output for transmission, the control method comprising:

a converting step of converting a part of an optical signal output from said optical modulator into an electric signal;

an extracting step of extracting a frequency component of the driving signal contained in the converted electric signal obtained in the converting step;

a phase comparing step of comparing phases between the signal input in the driving step and the frequency component of the driving signal extracted in the extracting step; and a bias voltage controlling step of controlling the bias voltage to be applied to said optical modulator based on a result of the phase comparison in the phase comparing step.

8. An optical transmitter comprising:

a driving circuit for outputting a driving circuit signal, the driving circuit signal being based on a driving signal that is received via an input terminal;

an optical modulator for inputting the driving signal and outputting an optical pulse signal, the optical pulse signal including a driving frequency component that is based on the driving circuit signal;

a converting unit for converting a portion of the optical pulse signal into an electric signal;

an extracting unit for extracting at least the driving frequency component from the electric signal and outputting an extracted signal;

a phase comparing unit for comparing phases between the driving signal and the extracted signal; and a bias voltage control unit for controlling a bias voltage being applied to the driving circuit signal, which is then input to the optical modulator, on the basis of a result provided by the phase comparing unit.

* * * * *